Aug. 12, 1958   C. E. HEMMINGER ET AL   2,847,360
HYDROFORMING PROCESS WITH TEMPERATURE GRADIENTS
Filed Oct. 5, 1953
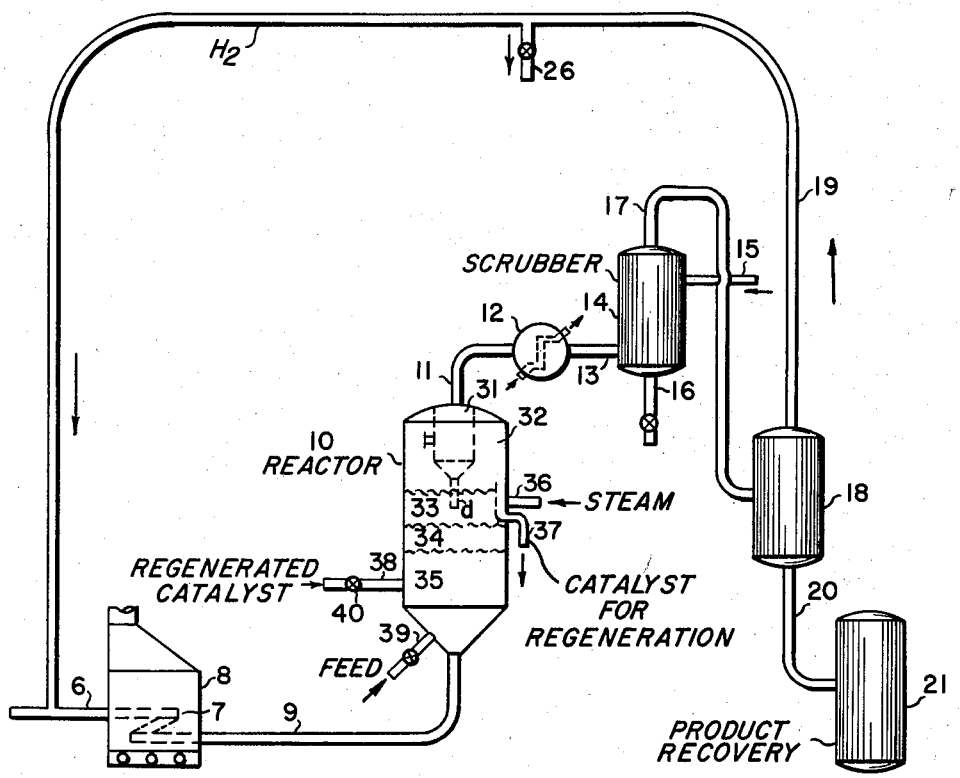
Charles E. Hemminger
Homer Z. Martin
Wilson C. Rich, Jr.
Edward J. Gornowski         Inventors
By  J. Cashman              Attorney United States Patent Office 2,847,360
Patented Aug. 12, 1958

2,847,360

HYDROFORMING PROCESS WITH TEMPERATURE GRADIENTS

Charles E. Hemminger, Westfield, Homer Z. Martin, Cranford, Wilson C. Rich, Jr., Mountainside, and Edward J. Gornowski, Cranford, N. J., assignors to Esso Research and Engineering Company, a corporation of Delaware Application October 5, 1953, Serial No. 384,262

4 Claims. (Cl. 196—50)

This invention relates to improvements in the hydroforming of naphthas. More particularly it relates to a process wherein temperature gradients are utilized within the hydroforming reactor so as in turn to provide a process of improved flexibility and heat balance.

Hydroforming is defined as an operation in which a petroleum naphtha is contacted at elevated temperatures and pressures and in the presence of a recycled hydrogen-containing gas with a solid catalytic material under conditions such that there is no net consumption of hydrogen.

Usually the feed stock boils substantially within the range of from about 150°–430° F. and more particularly 200–350° F. The light ends, i. e., the material boiling from about 0°–200° F., are not usually subjected to this reaction, for the reason that the virgin naphtha light ends have a fairly good octane rating. The feed or charging stock to the hydroforming reactor can be a virgin naphtha, a cracked naphtha, a Fischer-Tropsch naphtha, a mixture of these, or the like.

Hydroforming operations are ordinarily carried out in the presence of hydrogen or hydrogen-rich recycle gas at temperatures of 800°–1000° F., in the pressure range of about 50 to 500 pounds per square inch, and in contact with hydroforming catalysts.

The chemical reactions involved in the hydroforming process include dehydrogenation of naphthenes to the corresponding aromatics, isomerization of straight chain paraffins to form branched chain paraffins, isomerization of cyclic compounds such as ethylcyclopentane to form methylcyclohexane, and some aromatization, dealkylation and hydrocracking of paraffins. In a hydroforming operation which is conducted efficiently it is possible with the use of a proper catalyst and proper conditions of operation to hydroform a virgin naphtha having an octane number of about 50 to a hydroformate having an octane number of from 95 to 98 and obtain yields of $C_5+$ hydrocarbons as high as 85%.

It has been proposed in application Serial No. 188,236, filed October 3, 1950, now U. S. Patent No. 2,689,823, to effect the hydroforming of naphtha fractions in the presence of a dense fluidized catalyst mass in a fluidized solids reactor system in which naphtha vapors are passed continuously through the dense, fluidized bed of hydroforming catalyst particles in a reaction zone, spent catalyst particles being withdrawn from the dense bed in the reaction zone and passed to a separate regeneration zone where fouling, deactivating carbonaceous deposits are removed by combustion, whereupon the regenerated catalyst particles are returned to the main reactor vessel. Fluid hydroforming, as thus conducted, has several fundamental advantages over fixed bed hydroforming such as (1) the operations are continuous, (2) the vessels and equipment can be designed for single rather than dual functions, (3) the reactor temperature is substantially constant throughout the bed, and (4) the regeneration or reconditioning of the catalyst may be readily controlled.

One of the main problems in carrying out a hydroforming operation is that of supplying heat to support the highly endothermic reaction. Some heat can be supplied to the reaction zone in the preheating of the oil feed. Since the naphthenes contained in the feed are subject to thermal cracking if the preheat temperature exceeds about 1000° F., there is a limitation on the amount of heat that may be added in this manner.

Another method of adding heat to the reactor is through the sensible heat contained in the hot regenerated catalyst. However, since hydroforming catalysts as a class are injured when heated to temperatures appreciably above 1200° F., there is a further limitation on the amount of heat that can be transferred from the regenerator to the reactor by the hot regenerated catalyst. Furthermore, with respect to adding heat by means of a hot regenerated catalyst, it is pointed out that the catalyst to oil ratio, in other words, the weight of catalyst per weight of oil which may be transferred to the reactor from the regeneration, is limited to about 1 for high severity operations, because catalyst to oil ratios above 1 result ordinarily in the formation of excessive coke.

Another way to supply heat to the reaction zone is by high recycle gas rates, heating the hydrogen-containing gas to a temperature of 1100°–1250° F. However, since the reaction products are usually cooled to about 100° F. before the hydrogen is separated therefrom, the cost of reheating this recycle gas is quite expensive. Also, temperatures above 1200° F. cause excessive thermal cracking of the $C_4+$ hydrocarbons present in the recycle gas stream.

The past fluid hydroforming reactors have been isothermal in design and the heat of reaction was provided by sensible heat in gas, feed, and regenerated catalyst. Studies in fluid pilot plants have shown that, when temperature gradients in the order of 25°–50° F. in either direction are experienced or imposed by baffles in a fluid reactor, the yields and selectivity of the operation are not affected. This is especially true with optimum type alumina base catalysts.

The present invention provides an improved method of decreasing the heat requirements of hydroforming processes while providing the same degree of reaction in the hydroformer, and additionally supplying advantageous conditions therein.

Briefly, the hydroforming process of this invention is carried out in a single, staged reactor with baffles extending across for the purpose of obtaining higher temperatures in the lower zones and successively lower temperatures in successively higher zones. The hot feed vapors and catalyst are introduced at the lower portion of the reactor. By these means the catalyst requirements are reduced or the total heat input to reactor with the same catalyst utilization can be lowered. Finally, advantage is taken of the different reacting conditions existing in the plurality, i. e., two or more zones, of the reactor.

In conventional fluid hydroforming, as explained before, usually a single bed has been utilized, and due to the very thorough mixing of the catalyst particles a uniform temperature existed in the reactor. The hydroforming reaction is very endothermic with the heat requirement in the order of 200–350 B. t. u. per barrel of feed. This would be equivalent to a temperature drop of the order of 200°–250° F. if heat were not added to the reactor by means of hot catalyst and large quantities of superheated recycle gas. The conventional operation for a 900° reactor temperature calls for the introduction of hot regenerated catalyst at 1125° F., equivalent to one pound of catalyst per pound of liquid feed. Also, about 4,000 to 5,000 cubic feet per barrel of recycle gas heated to about 1200° F. is introduced. The coolers, separators, compressors, and furnaces to supply this hot recycle gas are a major expense in the design of the hydroformer. Moreover, thermal cracking of heavy hydrocarbons as $C_5$ and $C_6$ gases in the recycle stream at 1200° is deleterious in producing methane from the desirable gasoline components.

The insertion of a baffle in the fluid reactor designed so that the velocities through the aperture of the baffle or grid are such that little or no back mixing of the catalyst from the aperture section to the lower section takes place makes possible two or more zones of different temperatures in the reactor. The lower zone is hotter because only a part of the endothermic heat of reaction is consumed in the lower zone. In the upper zone the remainder of the heat required for reaction is consumed, and the gases, feed and catalyst passing through the second zone are cooled as they supply the heat of reaction in the second zone. With the same outlet temperature in the baffled reactor as in a conventional reactor, less catalyst is employed in the reactor because part of the catalyst is utilized at an average temperature higher than in the conventional reactor. Using the same amount of catalyst, the outlet temperature can be decreased so that the temperature difference between the inlet and the outlet products is made greater and more sensible heat is available from these components to provide the heat of reaction in the reactor.

By employing multiple baffles in the reactor so that the temperature difference from the inlet to the outlet is made significant, say 950° inlet and 850° outlet, hydrocarbons which are to be subjected to a major degree of hydrogenation may be introduced in this cooler section. Examples of these materials are the treating of light catalytic naphtha for the purpose of desulfurization and saturation to make aviation gasoline blending stock. Another desirable feed is light virgin naphtha high in sulfur, which can be desulfurized at a relatively low temperature and short contact time with a catalyst to substantially remove all the sulfur.

It is apparent, therefore, that this invention provides a process for utilizing concurrent flow of reactant vapors and catalyst in which successively higher zones of the hydroforming reactor are at successively lower reaction temperatures.

This invention will be better understood by reference to the flow diagram shown in the drawing.

In the drawing, vertical reactor 10 contains a plurality of separate reaction zones 33 and 35 with superimposed beds of fluidized solid catalyst, only two being shown, 33 and 35, separated from each other by baffle plate 34 extending across the cross section of the reactor. The hot regenerated catalyst is fed through line 38 to the lower bed 35 below the baffle plate 34 at a rate controlled by valve 40. A preheated feed stream of oil vapors is fed to the reactor system through line 39.

Simultaneously "recycle" gas, that is to say, hydrogen-containing gas, is sent after heat exchange to line 6 and thence charged to a coil 7 disposed in a furnace 8 wherein it is heated to a temperature of about 1200° F. This recycle gas contains normally gaseous hydrocarbons and hydrogen. The preheated hydrogen-containing gas is withdrawn from coil 7 through line 9 and charged into the bottom of reactor 10. It is to be noted that the oil and the hydrogen-containing gas are not mixed prior to their entry into the bed of catalyst. The gasiform material, that is to say, the vaporized oil and the hydrogen-containing gas, pass upwardly through the bed of catalyst at a superficial velocity of from about ½ to 3 feet per second, where they create within each zone a superficial velocity sufficient to maintain the solids therein in the form of a dense, turbulent suspension. Temperatures, pressures, and gas velocities used for the practice of this invention are those characteristic of ordinary fluid bed operations. Thus, a concurrent flow of catalyst and feed vapors is set up as indicated above with successively higher zones of said reactors at successively lower reaction temperatures, e. g., 890°, 850° 825° or 1000°, 950°, 900°, etc. Since during the hydroforming operation the catalyst in reactor 10 becomes contaminated with carbonaceous and other deposits, it is necessary to regenerate the catalyst. Toward this end catalyst is steam stripped with steam entering through line 36, and the stripped catalyst is withdrawn through line 37 for regeneration.

Before the crude product is withdrawn from the reactor it is forced through one or more gas-solids separating devices 31 (one shown) wherein entrained catalyst is separated from the gases and returned to the dense bed through one or more dip pipes $d$. The crude product is withdrawn overhead from the reactor through line 11, thence passed through a cooler 12 wherein it can be cooled by heat exchange with cold feed to preheat the latter and/or recycle gas. The cooled product is withdrawn from cooler 12 via line 13 and thence charged into a scrubber 14.

A heavy oil is charged to scrubber 14 through line 15 and passes downwardly countercurrent to the upflowing gasiform material charged to the scrubber via line 13. The heavy oil cools the vapors sufficiently to condense heavy polymer, which is rejected from the system through line 16. The amount of this heavy polymer material is usually not more than about 2 volume percent based on feed. The uncondensed material is withdrawn overhead from scrubber 14 through line 17 and thence passed after cooling into a separation drum 18. From separation drum 18 the hydrogen-containing recycle gas is taken off overhead through line 19. A bottoms fraction is taken off through line 20, and this material, which contains the desired hydroformate product, is delivered to a product recovery system 21, where it is distilled and otherwise treated according to conventional means to recover the desired product. The recycle material in passing through the coil 7 in furnace 8 is heated to the desired temperature. This material is then withdrawn through line 9 and fed into the reactor as previously indicated.

This recycle hydrogen-containing gas stream is an important part of the hydroforming process, since it serves to maintain within the reaction zone the high hydrogen partial pressure which represses coke formation and is in many ways essential to the production of the desired high quality product. The amount of this gas required varies with the feed stock and catalyst employed. It is continuously recycled, and maintained within the broad range of from about 1000 to 8000 standard cubic feet/barrel of naphtha feed (S. C. F./B.). It will be understood that the equipment may include suitable means for removing undesirable impurities from the recycle gas stream. Also, a small portion of the total gas stream is ordinarily bled off through a suitable withdrawal line 26 to compensate for the hydrogen continuously produced in the hydroforming reaction. Regenerated catalyst can be introduced into either bed. A downcomer can be provided to permit catalyst flow between beds.

In the design of the reactor the baffle plate is approximately positioned to give the distribution of the reaction or the distribution of the endothermic heat. In operation the distribution of the heat in the reactor and the catalyst in the reactor is obtained by several means of control. The catalyst level in the bottom zone will increase until the entrainment of catalyst through the holes of the grid will equal the feed of regenerated catalyst to this zone. The level of catalyst, as well as the weight of catalyst in this zone, can be varied by increasing or decreasing the velocity in this zone by using more or less recycle gas or more or less feed vapors. A higher velocity will increase the entrainment rate for a given level in a bottom zone and as a result the level will decrease until the disengaging zone becomes high enough to decrease the entrainment rate equal to the feed catalyst rate. Moreover, the increased velocity in the bottom zone will decrease the density of the catalyst in that zone so that fewer pounds of catalyst will be held in this bottom zone.

The control of the quantity of catalyst in the top zone is obtained by conventional flow rate control instruments. A level controller is installed for the catalyst in the top section. It is connected to a slide valve or flow control valve to the spent catalyst line. Fixing the desired level in the level controller, the controller automatically opens or closes the spent catalyst valve so that more or less catalyst is withdrawn from the top zone until it exactly equals the catalyst feed to the top zone through the baffles. If a greater height of catalyst is desired in the top zone, this is obtained by means of the level controller which automatically closes the spent catalyst line and reduces flow until the level in the top zone reaches the desired condition. Then the spent catalyst valve is automatically opened to such a degree that the input and output of catalyst to the top zone is in balance.

In order to explain the invention more fully, the following conditions of operation of the various components are set forth below and in the examples.

CONDITIONS IN REACTOR 10

|  | Preferred | Range |
| --- | --- | --- |
| Catalyst composition, percent $MoO_3$ on activated alumina | 8–12 | 5–20 |
| Temperature, °F | 900–950 | 800–1,000 |
| Pressure, p. s. i. g | 150–250 | 50–500 |
| Catalyst to oil ratio | 0.5 to 2.0 | 0.1 to 7 |
| Cu. ft. of recycled gas fed/bbl. of oil | 2,500–7,000 | 2,000–10,000 |
| Concentration of $H_2$ in recycle gas | 65–80 | 60–95 |

CONDITIONS IN REGENERATOR

|  | Preferred | Range |
| --- | --- | --- |
| Temperature, °F | 1,100–1,200 | 900–1,250 |
| Pressure, p. s. i. g | 150–250 | 50–500 |
| Residence time, minutes | 6–30 | 6–180 |
| Fluidizing gas velocity | 0.4 to 1.0 | 0.3 to 2.0 |

*Example I*

Operation by the method of this invention will be compared with a standard hydroforming reaction wherein the reactor operates isothermally at 900° F. As contrasted with that, a two-stage reactor utilized as taught in this invention utilizes the same feed temperature, 1000° F., and recycle gas rate and temperature, 4400 ft.³/bbl. and 1200° F. The bottom stage of the two-stage reactor operates at about 940° F. and the upper at about 900° F. In both cases the feed and product streams enter and leave the reactor at the same temperature. Thus a higher average reactor temperature is obtained according to the process of this invention without any increase in heat requirements. This can be utilized in decreasing the size of the expensive reactors necessary for fluid hydroforming.

*Example II*

In this example a comparison is again made with a standard hydroforming reactor operating isothermally at 900° F. utilizing the same recycle gas rate and temperature. The recycle gas, however, to the hydroforming reactor utilizing this process, while having the same flow rate, has a temperature of only about 1178° F. as compared to 1200° F. for the control. In this case, then, a temperature of about 940° F. is obtained in the lower zone and about 890° F. in the higher zone. The reactor outlet temperature is therefore lower. This means that for a given severity of operation the heat requirements are lower. This advantage can be utilized to obtain a decreased recycle gas preheat temperature and/or a decreased recycle gas rate.

In the hydroforming process itself the feed stock is preheated alone or in admixture with recycle gas to reaction temperature or to the maximum temperature possible while avoiding thermal degradation of the feed stock. Ordinarily preheating of the feed stock is carried out to temperatures of about 800°–1050° F., preferably about 1000° F. The naphtha preheat should be as high as possible while avoiding thermal degradation thereof as by limiting the time of residence in the transfer or feed inlet lines. The preheated feed stock may be supplied to the reaction vessel in admixture with hydrogen-rich recycle gas or it may be introduced separately as shown. The recycle gas, which contains from about 50 to 80 volume percent hydrogen, is preheated to temperatures of about 1000°–1300° F., preferably about 1185° F., prior to the introduction thereof into inlet line 9. The recycle gas should be circulated through the reactor at a rate of from about 1000 to 8000 cubic feet per barrel of naphtha feed. The amount of recycle gas added is preferably the minimum amount that will suffice to carry the necessary heat of reaction into the reaction zone and keep the carbon formation at a satisfactory low level.

The fluidized reactor system is charged with a mass of finely divided hydroforming catalyst particles. Suitable catalysts for the operation include platinum, palladium, and Group VI metal oxides, such as molybdenum oxide, chromium oxide or tungsten oxide, or mixtures thereof upon a carrier such as activated alumina, zinc aluminate spinel, or the like. Preferred catalysts contain about 5 to 20 weight percent molybdenum oxide, 0.01 to 1.0 weight percent platinum, or from about 10 to 40 weight percent chromium oxide upon a suitable carrier. If desired, minor amounts of stabilizers and promoters such as silica, calcium oxide, ceria or potassia can be included in the catalyst. The catalyst particles are, for the most part, between 200 and 400 mesh in size or about 0–200 microns in diameter with a major proportion between 20 and 80 microns.

The advantages of the process of this invention are apparent to the skilled in the art. Savings in heat requirements and/or reactor size can be obtained. Even more, greater flexibility of operation is provided.

It is to be understood that this invention is not limited to the specific examples, which have been offered merely as illustrations, and that modifications may be made without departing from the spirit of this invention.

What is claimed is:

1. In a process for hydroforming petroleum naphthas in contact with finely divided hydroforming catalyst particles in accordance with the fluidized solids technique, the improvement which comprises maintaining temperature gradients in the reactor by feeding naphtha reactant vapors to a lower portion of a vertical reactor containing a plurality of superimposed beds of fluidized solids catalysts at reaction temperature within the range of about 800° to 1000° F.; passing the reactant vapors upwardly through successive zones containing the beds of catalyst; introducing hot recycle gas at a temperature between about 1000° and 1300° F. and hot regenerated catalyst to a lower portion of the reactor; withdrawing spent catalyst from an upper portion of the reactor; regenerating and heating the catalyst by an oxidative combustion process; returning the hot regenerated catalyst to the lower portion of the reactor as aforesaid; and thereby maintaining a concurrent flow of naphtha vapors and catalyst in which successive higher zones of said reactor are at successively lower reaction temperatures.

2. The process of claim 1 in which the reactor contains two zones with superimposed beds of fluidized catalyst, the lower zone being at a temperature of about 940° F. and the upper zone at a temperature of about 900° F.

3. The process of claim 1 in which the reactor contains two zones with superimposed beds of fluidized catalyst, the lower zone being at a temperature of about 940° F., the upper zone at a temperature of about 890° F.

4. The process of claim 1 in which the catalyst comprises 8 to 12 weight percent $MoO_3$ on activated alumina.

References Cited in the file of this patent

UNITED STATES PATENTS

| | | |
|---|---|---|
| 2,270,715 | Layng et al. | Jan. 20, 1942 |
| 2,425,098 | Kassel | Aug. 5, 1947 |
| 2,656,304 | McPherson et al. | Oct. 20, 1953 |
| 2,701,230 | Blanding | Feb. 1, 1955 |
| 2,758,062 | Arundale et al. | Aug. 7, 1956 |